United States Patent [19]
Linton

[11] 4,331,206
[45] May 25, 1982

[54] FRONT-MOUNTED LEVELING AND TILLAGE IMPLEMENT

[76] Inventor: Kenneth B. Linton, R.R. #1, Box 155, Van Wert, Ohio 45891

[21] Appl. No.: 200,444

[22] Filed: Oct. 24, 1980

[51] Int. Cl.³ .......................................... A01B 59/048
[52] U.S. Cl. .................................. 172/834; 172/430; 172/483; 172/311
[58] Field of Search ............... 172/810, 833, 834, 134, 172/311, 456, 430, 483, 448, 449, 272

[56] References Cited

U.S. PATENT DOCUMENTS

| | | | |
|---|---|---|---|
| 2,555,954 | 6/1951 | Brulat | 172/430 X |
| 2,609,741 | 9/1952 | Evenson | 172/810 |
| 3,138,210 | 6/1964 | Behrens | 172/834 |
| 3,224,392 | 12/1965 | Mellen | 172/810 X |
| 3,262,505 | 7/1966 | Brakhage | 172/456 |
| 3,314,386 | 4/1967 | Kopaska | 172/456 |
| 3,542,138 | 11/1970 | Fackler | 172/311 X |
| 4,044,843 | 8/1977 | Holub | 172/810 |

FOREIGN PATENT DOCUMENTS 1042936  9/1954  Fed. Rep. of Germany ...... 172/810

*Primary Examiner*—Richard J. Johnson
*Attorney, Agent, or Firm*—Gust, Irish, Jeffers & Hoffman

[57] ABSTRACT

A ground leveling and tillage implement for attachment to the front of a tractor includes an elongated frame element disposed transversely in front of the front wheels of the tractor and generally parallel with the ground. A generally rectangular tine-supporting frame is provided having spaced opposite sides and ends, and having a plurality of ground-working tines mounted thereon and depending therefrom. The supporting frame is mounted intermediate its ends on the frame element for pivotal movement about an axis parallel with its sides and with the frame element between an operative position extending forwardly of the frame element and generally parallel with the ground and with the tines in engagement therewith, and a generally upright transport position. Selective adjustment of the supporting frame with respect to the ground in the operative position is provided so as to level the supporting frame, and selective vertical adjustment of the frame element is provided so as to adjust the depth of penetration of the tines in the operative position of the supporting frame. A power cylinder is provided for moving the supporting frame between its positions, and wheels may be mounted on the forward side of the supporting frame for inhibiting gouging.

14 Claims, 11 Drawing Figures

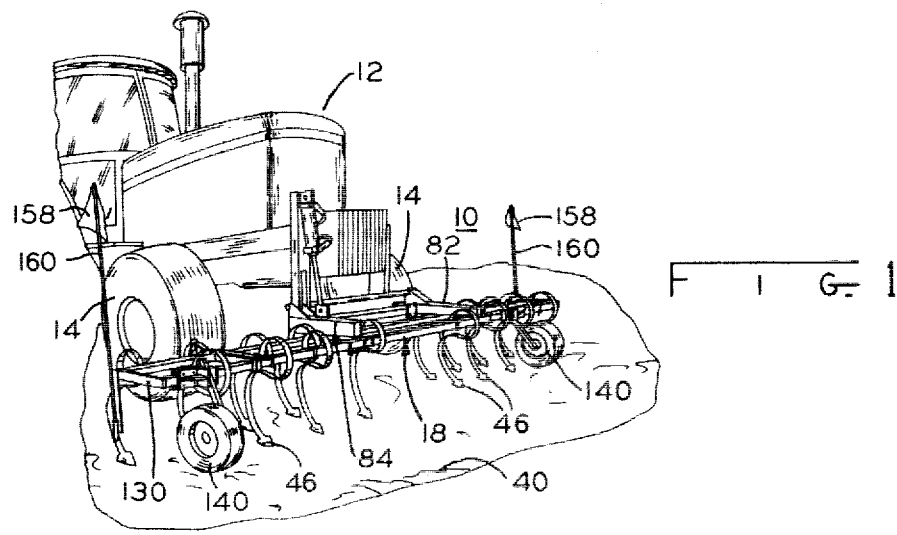
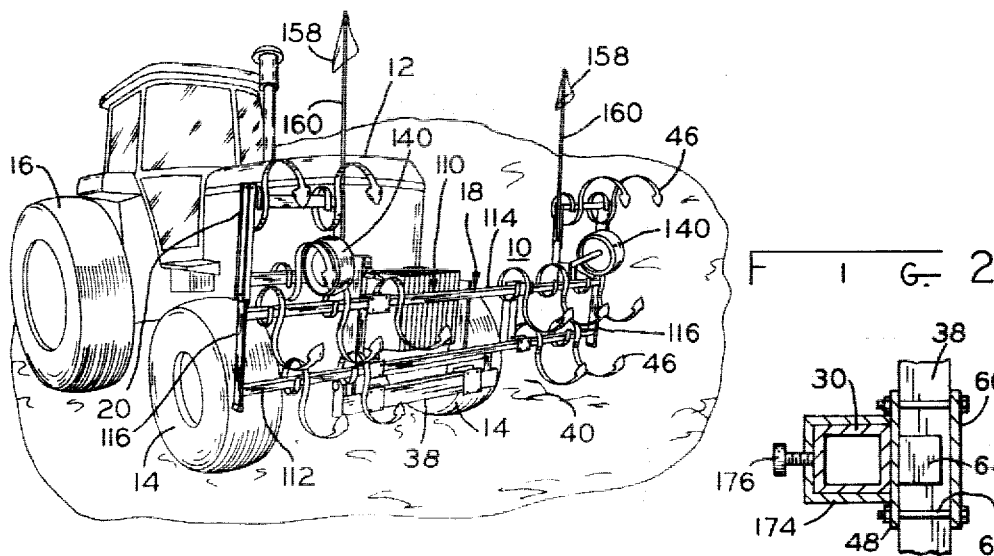
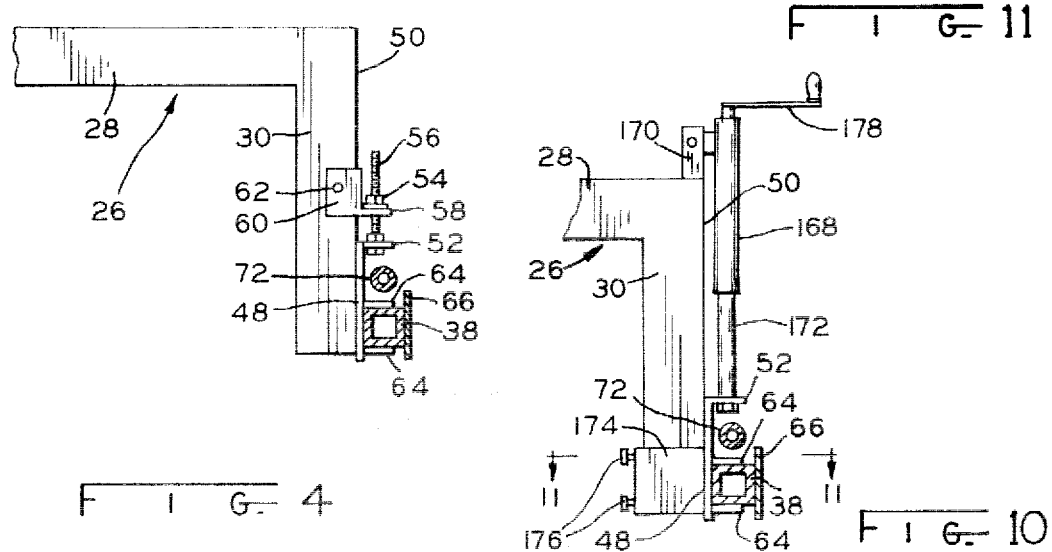

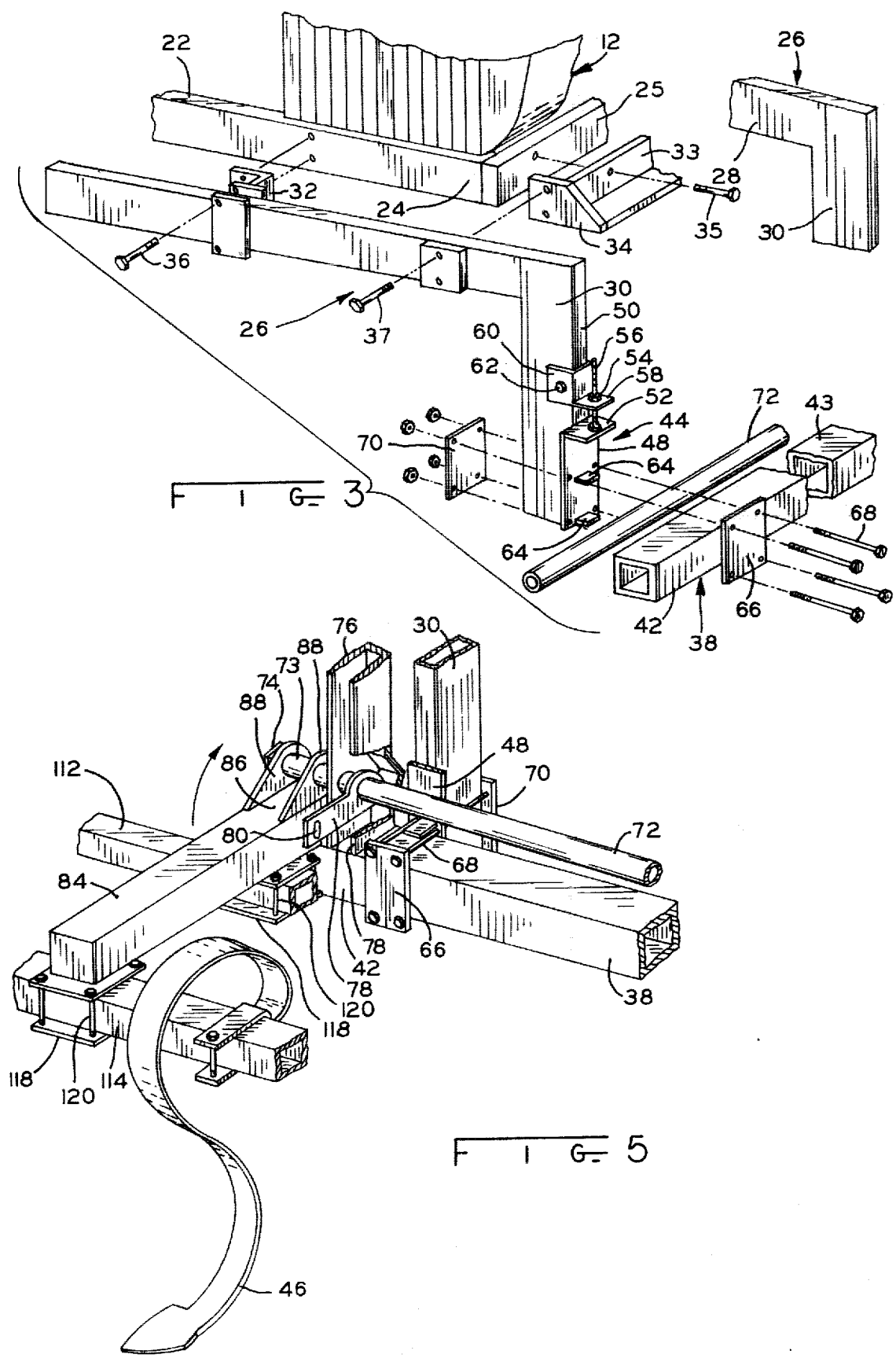

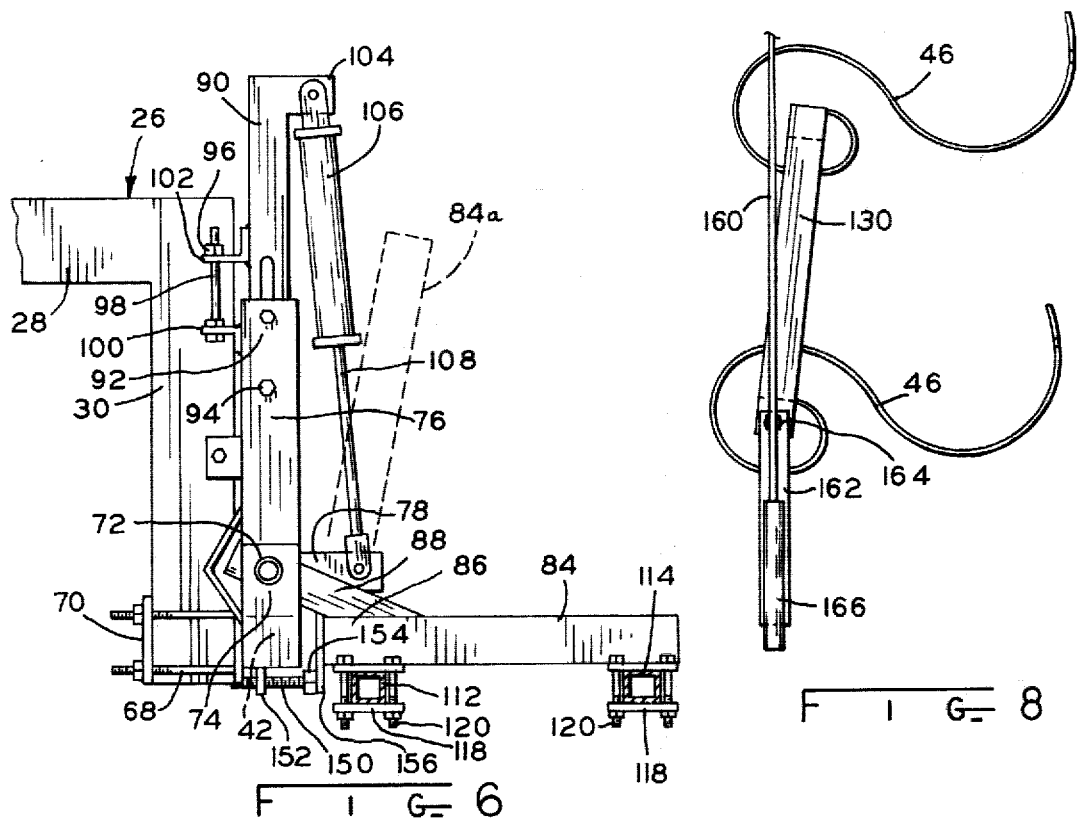
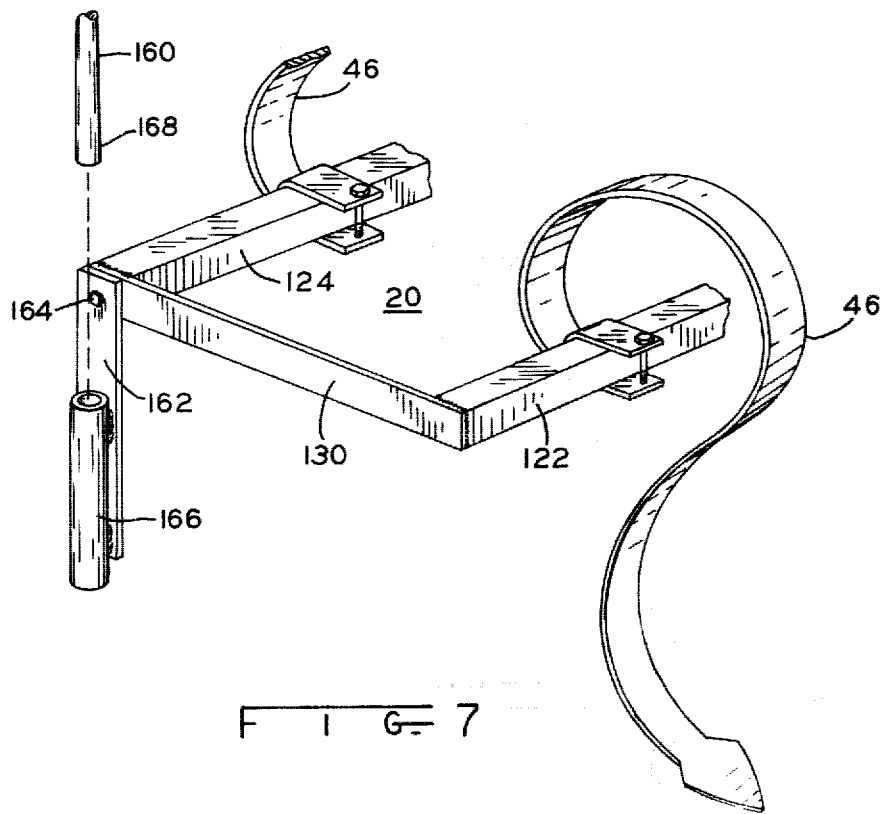

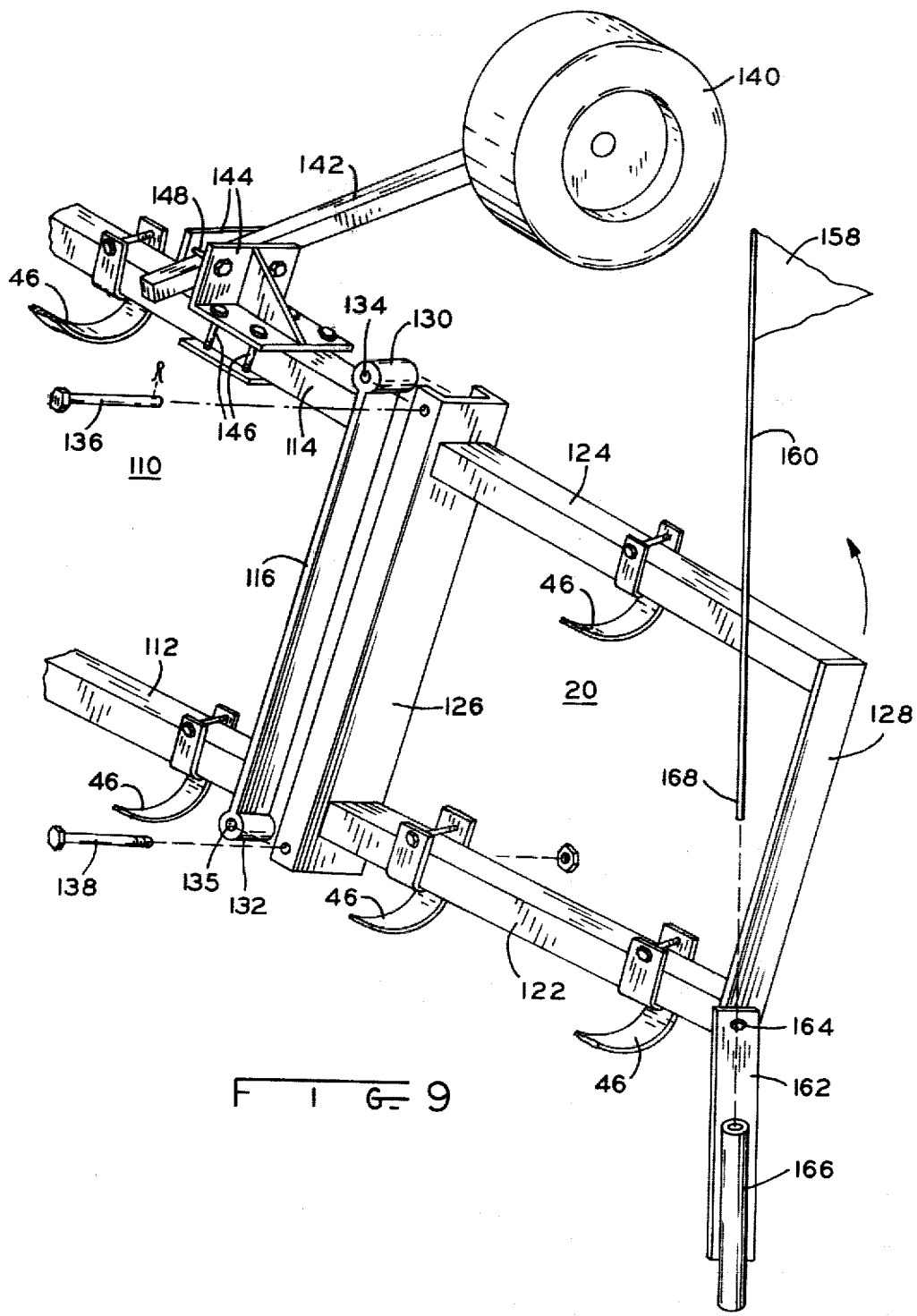

4,331,206

FRONT-MOUNTED LEVELING AND TILLAGE IMPLEMENT

BACKGROUND OF THE INVENTION

1. Field of the Invention

This invention relates generally to farm implements, and more particularly to a front-mounted leveling and tillage implement.

2. Description of the Prior Art

It is common practice to till farm land prior to fertilizing and seeding. Where the ground to be tilled has previously been plowed, such tilling is generally transverse to the direction of plowing and resultantly, the operator of the tractor plowing the tilling or harrowing implement is subjected to an extremely rough ride and tilling thus becomes a relatively slow, fuel-consuming operation, particularly where the ground was plowed the previous fall. Further, due to the rough, jerky conditions of tractor operation, it has not been feasible to apply pesticide/herbicide chemicals and to plant simultaneous with the tilling operation and thus, yet another operation has been required following tilling involving further time and fuel expense.

In order to eliminate the rough and jerky tractor operation during tilling previously plowed ground, a variety of types of front-mounted leveling implements have been proposed for initially leveling or smoothing the ground ahead of the wheels of the tractor, such prior front mounted leveling implements being shown, for example, in U.S. Pat. Nos. 2,529,007; 2,160,524; 3,138,210; 2,277,880; 2,282,367; 3,306,368; 2,415,744; and 2,131,872. Front-mounted cultivators, which inherently provided some leveling action, having also been proposed, such as those shown in U.S. Pat. Nos. 1,620,099 and 1,945,882. With the use of such front-mounted ground leveling implements, not only is the rough, jerky operation of the tractor eliminated thus permitting much faster operation, but it is also possible to tow herbicide/pesticide incorporation and fertilizing/planting implements behind the tractor thus saving the requirement for a subsequent incorporating and planting operation, in turn a great amount of time and fuel expense.

However, the prior front-mounted leveling and tillage implements known to the present applicant suffer from a variety of defects and limitations including such things as the inability to level the implement with respect to the ground and to adjust the depth of penetration of the tines during leveling and tilling, the lack of means for preventing "gouging" by the tines in the event that the front wheels of the tractor enter a depression or hole in the ground, the difficulty and time required to assemble and disassemble the implement on the tractor, and the capability of reducing the overall width of the implement for over-the-road travel and/or storage of the implement.

It is accordingly desirable to provide a front-mounted leveling and tillage implement which eliminates the disadvantages and limitations of prior implements of the general type.

SUMMARY OF THE INVENTION

The invention, in its broader aspects, provides a ground leveling and tillage implement for attachment to the front of a tractor having ground-supporting front and rear wheels. The implement comprises an elongated frame element having opposite ends, and means adapted to be removably attached to a tractor for supporting the frame element respectively adjacent the ends thereof in a position disposed transversely in front of the front wheels of the tractor and in spaced, generally parallel relationship with the ground. A generally rectangular tine-supporting frame is provided having spaced opposite sides and ends, and a plurality of ground-working tines is mounted on the supporting frame and depends therefrom. Means is provided for mounting the supporting frame intermediate its ends on the frame element for pivotal movement of the supporting frame about an axis parallel with its sides and with the frame element between an operative position extending forwardly from the frame element and generally parallel with the ground and with the tines in engagement therewith, and a generally upstanding transport position. The mounting means includes means for selectively leveling the supporting frame in its operative position with respect to the ground, and the supporting means includes means for respectively selectively vertically adjusting the opposite ends of the frame element with respect to the ground thereby to adjust the depth of penetration of the tines in the operative position of the supporting frame. Power means is provided for selectively moving the supporting frame between its positions.

In the preferred embodiment, the supporting frame comprises a center section and end sections respectively pivotally connected thereto for movement between extended positions and folded traveling and storage positions, and gouge-preventing wheels are adjustably mounted on the forward side of the supporting frame.

It is accordingly an object of the invention to provide an improved front-mounted leveling and tillage implement.

Another object of the invention is to provide an improved front-mounted leveling and tillage implement incorporating ready leveling and depth of penetration adjustments.

The above-mentioned and other features and objects of this invention and the manner of attaining them will become more apparent and the invention itself will be best understood by reference to the following description of an embodiment of the invention taken in conjunction with the accompanying drawings.

BRIEF DESCRIPTION OF THE DRAWINGS

FIG. 1 is a perspective view showing the improved front-mounted leveling and tillage tool of the invention in its operative position;

FIG. 2 is a perspective view showing the implement of the invention in its transport and storage position;

FIG. 3 is a fragmentary exploded view in perspective showing the attachment of the implement to a tractor frame, and also showing the depth adjustment mechanism;

FIG. 4 is a fragmentary side view, partly in section, showing the structure of FIG. 3;

FIG. 5 is a fragmentary perspective view, partly broken away and partly in section, illustrating a part of the mechanism for moving the tine assembly between its operative and storage positions;

FIG. 6 is a fragmentary side view, partly in section, further illustrating the mechanism shown in FIG. 5;

FIG. 7 is a fragmentary perspective view, partly exploded, illustrating the mounting of the guide flags on the tine assembly;

FIG. 8 is a side view further showing the guide flag mounting mechanism;

FIG. 9 is a fragmentary perspective view showing the tine supporting frame in its transport position, and further showing the mechanism for folding the end sections of the supporting frame, the gouge wheel mounting mechanism, and the guide flag mounting mechanism;

FIG. 10 is a fragmentary side view, partly in section, showing a modification of the implement of the invention; and FIG. 11 is a cross-section view taken generally along the line 11—11 of FIG. 10.

DESCRIPTION OF THE PREFERRED EMBODIMENT

Referring now to the figures of the drawings, the improved front-mounted leveling and tillage implement, generally indicated at 10 is shown attached to the front end of a conventional farm tractor 12 having front wheels 14 and rear wheels 16. FIG. 1 shows implement 10 with tine supporting frame assembly 18 in its lower, operative position, while FIG. 2 shows tine supporting frame assembly 18 in its raised or transport position and with its end sections 20 in their folded transport or storage positions.

Referring now additionally to FIGS. 3 and 4 of the drawings, tractor 12 includes side frame members 22 having front ends 24 (only the right tractor frame member 22 is shown) and front frame member 25. Leveling and tillage implement 10 is removably attached to tractor frame members 22 adjacent their forward ends 24 and to front frame member 25 by means of L-shaped support members 26 respectively having horizontal portions 28 and depending leg portions 30. Horizontal portions 28 of support members 26 are removably attached to tractor frame members 22 by side brackets 32, push bar 34 secured to front frame member 25 by suitable threaded fasteners 33 and having end plates 34 secured thereto, as by welding, and by suitable threaded fasteners 35, 36 and 37.

An elongated frame element 38 is provided extending transversely in front of tractor wheels in spaced, generally parallel relationship with the ground 40, and having opposite ends 42, 43. Frame element 38 is connected, respectively adjacent its ends 42, 43, to depending leg portions 30 of support members 26 by vertical adjusting mechanisms 44 which, as will hereinafter be described, provide vertical adjustment of the depth of penetration of tines 46 of tine assembly 18. Each adjustment mechanism 44 comprises plate 48 abutting forward edge 50 of depending leg portion 30, and having flange 52 extending from its upper end. The vertical height of plate 48 is adjusted by means of adjustment of nut 54 on screw 56, screw 56 being secured to flange 52 on plate 48 and nut 54 engaging flange 58 on bracket 60 secured to depending leg portion 30, as by threaded fasteners 62. A pair of spaced ears 64 extend from plate member 48 and serve to locate frame element 38. Frame element 38 is secured to plate member 44 by means of gusset plate 66 and suitable threaded fasteners 68, plate member 48 being secured at the selected vertical position by gusset plate 70 and threaded fasteners 68.

Referring now additionally to FIGS. 5 and 6, elongated hinge shaft 72 is provided parallel with and spaced above frame element 38 and having opposite ends 73 respectively connected by brackets 74 to ends 42, 43 of frame element 38. Upstanding member 76 has its lower end 78 connected to end 42 of frame element 38 between depending leg portion 30 of support member 26 and bracket 74, as by welding, as shown in FIG. 5. Hinge shaft 72 extends rotatably through suitable openings in up-standing member 76. Actuating lever member 78 is connected to hinge shaft 72 within the channel-shaped upstanding member 76. Actuating lever member 78 has lost-motion opening 80 in its outer end, as shown in FIG. 5. Lever members 82, 84 have their inner ends 86 respectively connected to ends 73 of hinge shaft 72 by means of pivot plates 88.

Member 90 is slidably received within upper end 92 of up-standing member 76 and is adjustably secured thereto by means of suitable threaded fasteners 94. The vertical position of member 90 with respect to upstanding member 76 is adjusted by adjustment of nut 96 on stud 98 which has its lower end secured to bracket 100 connected to upper end 92 of upstanding member 76. adjusting nut 96 engaging bracket 102 connected to member 90.

Member 90 has extension portion 104 at its upper end to which is connected fluid power cylinder 106. Cylinder 106 has its piston rod 108 connected to lost-motion opening 80 in actuating lever 78. It will now be seen that fluid power cylinder 106 may be selectively actuated pivotally to move lever members 82, 84 between a generally horizontally extending operative position, as shown in solid lines in FIGS. 5 and 6, and a generally upstanding transport and storage position, as shown in dashed lines at 84a in FIG. 6.

Referring additionally to FIG. 9, tine supporting frame 18 is generally rectangular and comprises center section 110 and end sections 20. Center section 110 of tine support frame 18 comprises spaced, parallel rear and forward side members 112, 114 and end members 116. Lever members 82, 84 respectively extend transversely across side members 112, 114 and are secured thereto by means of gusset plates 118 and suitable threaded fasteners 120, as shown in FIGS. 5 and 6. It will thus be seen that selective actuation of cylinder 106 will cause pivotal movement of tines supporting frame 18 from its operative position, as shown in FIG. 1, to its raised, transport position, as shown in FIG. 2.

End sections 20 of tine supporting frame 18 comprise side members 122, 124 and end members 126, 128. End members 116 of center section 110 of tine supporting frame 18 have end portions 130, 132 respectively having openings 134 formed therethrough. Inner end members 126 of outer sections 20 of tine supporting frame 18 are channel-shaped and receive end members 116 and their end portions 130, 132 in the unfolded positions of end sections 20. End sections 20 are pivotally secured to center section 110 by means of pivot pins 136 extending through openings 134 in end portion 130 of end members 116, and are secured in their extended positions, as shown in FIG. 1, by suitable threaded fasteners 138 extending through openings 135 in end portions 132. It will now be seen that upon removal of threaded fasteners 138, end sections 20 may be pivotally moved in the plane of center section 110 to their folded, storage and transport positions, as shown in FIG. 2.

Conventional ground working tines 46 may be secured at desired locations and in the desired number to side members 112, 122 and 114, 124 of tine supporting frame 18. It will be readily understood that any desired type of tine or shovel 46 may be employed. It will also be understood that tines 46 may be arranged only in front of tractor wheels 14, 16, as shown in FIGS. 1 and 2, or may extend entirely across center section 110 of tine supporting frame 18. The overall length of the tine supporting frame 18 is preferably at least as long as the overall width of tractor 12 between the outer sides of rear wheels 16.

Suitable gouge-preventing wheels are rotatably mounted on members 142 adjustably secured to forward side members 114 of center section 110 of tine support frame 18 by means of gusset plates 144 and suitable threaded fasteners 146, 148, as shown in FIG. 9, thus permitting adjustment of the height of gouge wheels 142 with respect to the plane of the ends of tines 46.

Referring again to FIG. 6, tine supporting frame 18 is leveled by means of adjusting screws 150 threadedly received in members 152 respectively connected to bracket plates 74 at each end of frame element 38, bolts 150 having adjusting heads 154 which engage plates 156 on inner ends 86 of lever members 82, 84. It will thus be seen that supporting frame 18 is leveled in its operative position by selective adjustment of adjusting bolts 150.

In order to permit the operator of tractor 12 to observe the path of outer ends 128 of side sections 20 of tine supporting frame 18, suitable guide flags 158 are provided on elongated, flexible poles 160. In order to permit poles 160 and flags 158 to stand generally erect in either the operative or transport positions of tine supporting frame 18, and in either the extended or folded positions of end sections 20, lever members 162 are pivotally connected to end members 128 of side sections 20 of tine support frame 18, as at 164 and thus, depend generally vertically downwardly therefrom under the influence of gravity, regardless of the position of end members 130. Sockets 166 are connected to member 162 for receiving lower ends 168 of flag poles 160, and members 162 and/or sockets 166 are suitably counter-weighted so that members 162, sockets 166 and flag poles 160 are substantially vertically disposed in any position of tine supporting frame 18 and its end sections 20, as shown in FIG. 1, 2, 7, 8 and 9.

Referring now to FIGS. 10 and 11 in which like elements are shown by like reference numerals, a modification is shown in which conventional jacks 168 are substituted for adjusting screws 56 and brackets 60 shown in FIGS. 3 and 4. Jacks 168 are attached to support members 26 by upstanding brackets 170 and have their extensible portions 172 connected to flanges 52. Here, U-shaped members 174 are secured to plates 48, as by welding, and embrace leg portions 30 of support members 26. Studs 176 secure plate member 48 and frame element 38 at the vertical position selected by manual adjustment of jacks 168 by means of cranks 178.

It will now be seen that the improved front-mounted leveling and tillage implement of the invention will level and till the soil in front of the tractor providing a much smoother ride, better traction, and much faster travel, and permitting pulling any combination of an anhydrous ammonia, herbicide or pesticide tank and applicator, field cultivator or planter behind the tractor for a one-pass tilling, cultivating, incorporating and planting operation thus affecting a great saving of time and fuel expense.

While there have been described above the principles of this invention in connection with specific apparatus, it is to be clearly understood that this description is made only by way of example and not as a limitation to the scope of the invention.

What is claimed is:

1. A ground leveling and tillage implement for attachment to the front of a tractor having ground-supported front and rear wheels, said implement comprising: an elongated frame element having opposite ends; means adapted to be removably attached to said tractor for supporting said frame element respectively adjacent said ends thereof in a position disposed transversely in front of said front wheels and in spaced, generally parallel relationship with the ground; a generally rectangular tine-supporting frame having spaced opposite sides and ends; a plurality of ground-working tines mounted on said supporting frame and depending therefrom; means for pivotally mounting said supporting frame intermediate its ends on said frame element for pivotal movement of said supporting frame about an axis parallel with said sides and with said frame element between an operative position extending forwardly of said frame element and generally parallel with the ground and with said tines in engagement therewith, and a generally upstanding transport position; said mounting means including means for selectively leveling said supporting frame in said operative position with respect to the ground; said supporting means including means for respectively selectively vertically adjusting said opposite ends of said frame element with respect to the ground thereby to adjust the depth of penetration of said tines; and power means for selectively moving said supporting frame between said positions thereof.

2. The implement of claim 1 wherein said tractor includes a frame having a front end and spaced parallel sides, said supporting means comprising a pair of support members adapted respectively to be attached to said sides of said tractor frame and having forward ends extending forwardly of said tractor frame front end, said support members respectively having portions depending from said forward ends thereof, and said vertical adjusting means including means for respectively attaching said frame element adjacent said opposite ends thereof to said depending portions for limited vertical movement thereon.

3. The implement of claim 2 wherein said mounting means comprises a pair of lever members respectively extending transversely across said supporting frame and respectively secured thereto, and said pivotal mounting means including means for pivotally connecting said lever members to said frame element respectively adjacent said opposite ends thereof.

4. The implement of claim 3 wherein said leveling means acts between said depending portions of said support members and said lever members.

5. The implement of claim 4 wherein said connecting means comprises an elongated hinge shaft in spaced, parallel relationship with frame element, and said pivotal mounting means including means for rotatably mounting said shaft on said frame element, said shaft having opposite ends, said lever members being respectively connected to said shaft adjacent said opposite ends thereof, said power means comprising an actuating lever member connected to said shaft, and a fluid power cylinder acting on said actuating lever member.

6. The implement of claim 5 wherein said power means further comprises a member connected to said frame element and upstanding therefrom to an upper end, said fluid power cylinder also acting on said upper end of said last-named member.

7. The implement of claim 6 wherein said last-named member comprises lower and upper parts arranged in telescoping relation, and means for adjustably connecting said parts for selective adjustment of the length of said last-named member thereby to adjust the stroke of said cylinder.

8. The implement of claim 1 or claim 7 wherein said tines respectively have lower ends lying generally in a plane parallel with said supporting frame, and further comprising a pair of gouge-preventing wheels mounted on said supporting frame forwardly of the forward side thereof, and means for selectively adjusting the height of said wheels with respect to said plane.

9. The implement of claim 8 wherein said supporting frame comprises a center section having opposite ends and two end sections respectively connected to said center section ends for pivotal movement between extended positions and folded positions.

10. The implement of claim 9 wherein the overall length of said supporting frame in said extended position thereof is at least equal to the overall width of said tractor.

11. The implement of claim 10 wherein the pivotal movement of said end sections of said supporting frame is respectively generally in the plane of said supporting frame about axes generally located adjacent one said side thereof.

12. The implement of claim 11 wherein each end section of said supporting frame has an outer end, and further comprising means for removably receiving the lower end of a pole for a guide flag, said receiving means being respectively pivotally mounted on said outer ends of said end sections, said receiving means respectively including means for counter-weighting the same whereby said poles stand generally erect in either position of said support frame and either position of said end sections.

13. The implement of claim 1 further comprising means for removably receiving the lower end of a pole for a guide flag respectively pivotally mounted on said ends of said support frame, said receiving means respectively including means for counter-weighting the same whereby said poles stand generally erect in either position of said supporting frame.

14. The implement of claim 2 wherein said vertical adjusting means includes manually actuated jacks, and means for securing said attaching means to said depending portions at the vertical position selected by said jacks.

* * * * *